March 1, 1966
H. C. HARBERS
3,237,957
CARRIAGE WITH COMPOUND SPRING SUSPENSION ASSEMBLY
Filed Jan. 4, 1965
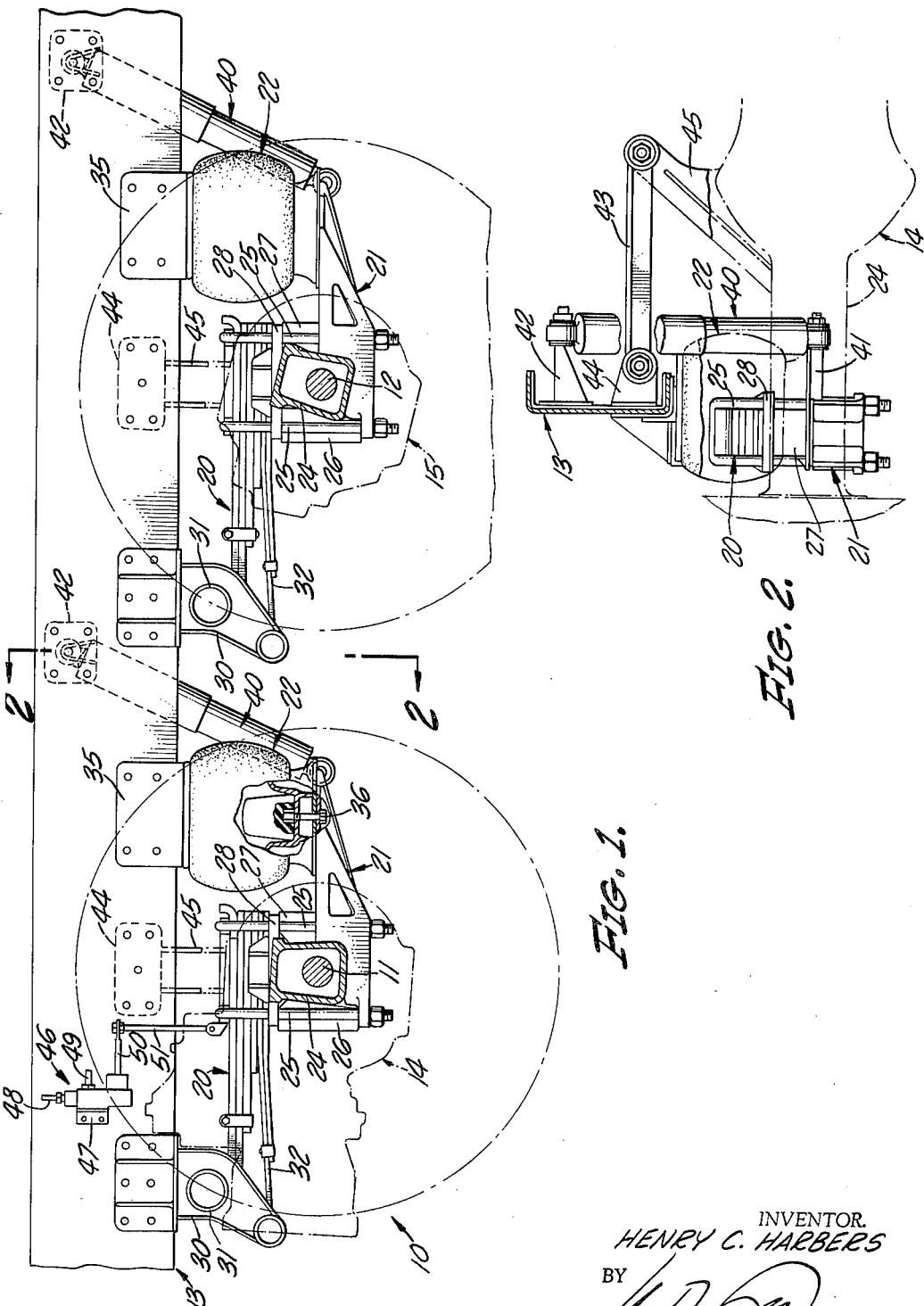
INVENTOR.
HENRY C. HARBERS
BY
ATTORNEY

# United States Patent Office 3,237,957
Patented Mar. 1, 1966

3,237,957
CARRIAGE WITH COMPOUND SPRING SUSPENSION ASSEMBLY
Henry C. Harbers, Pasadena, Calif., assignor to Western Unit Corporation, City of Industry, Calif., a corporation of California
Filed Jan. 4, 1965, Ser. No. 423,044
7 Claims. (Cl. 280—6)

This invention relates to spring suspension assemblies for vehicles and more particularly to an improved low-height spring suspension unit capable of providing a soft ride for a wide range of cargo weights.

The designer of cargo vehicles for over-the-highway operation is confronted with the need for providing a suspension system capable of providing resiliency for the chassis when traveling empty as well as providing a soft ride for a wide range of cargo loads. An additional requirement commonly present is the need for locating the cargo platform as close as feasible to the ground while at the same time maintaining maximum clearance between the road bed and the lowest portions of the axle and suspension assemblies.

A variety of proposals have been made in attempts to accommodate these conflicting requirements. These are subject to numerous disadvantages and shortcomings avoided by the unique arrangement of components characterizing the present invention.

To meet these and related desirable objectives there is provided by the present invention a simple, rugged spring suspension assembly utilizing a plurality of suspension components interconnected in series with one another between the chassis frame and the opposite ends of the carriage axle. In a typical illustrative embodiment, a spring beam and a rigid beam are rigidly interconnected at one pair of adjacent ends in vertically offset relation with the remote end of one beam pivotally connected to the chassis and the remote end of the other beam underlying the axle and serving as the support for the lower end of an air spring having its upper end connected to the chassis. Typically, the carriage axle passes through the connection between the two types of beams in an area intermediate the upper and lower portions thereof. The air spring is operatively connected with height control valve means effective to sense changes in loading and controlling the air supply to the air spring in proportion to changes in load on the vehicle.

Desirably each of the composite suspension beams is formed simply, inexpensively and, in the interests of low-height and vertical compactness, each of the beam components is straight and extends generally horizontally. In a preferred construction the spring beam is made of generally straight spring leaf components with one end attached rigidly to the axle. If the spring beam is located above the axle as is preferred, then the rigid beam is connected to the underportion of the axle end of the spring beam with its free end providing a rigid shelf for the support of the air spring. Owing to the fact that one end of the spring may terminate at the axle and that the rigid beam underlies and provides a relatively short extension of the spring beam, there is ample room to accommodate a large capacity air spring closely spaced to the axle.

The present composite suspension assembly and carriage unit can be used individually or in tandem with one another. In either case a single height control sensing valve unit with connections leading to the individual air springs suffices to control the air supply to all air springs. Alternatively separate height control valves can be used with each air spring, or with each pair of air springs, as preferred. In each of these arrangements the valves are responsive to changes in height between the vehicle frame and the carriage axle or axles to vary the air in the air springs as necessary to maintain a generally uniform spacing between the vehicle frame and the axles despite wide range variations in loading on the vehicle.

It is therefore a primary object of this invention to provide an improved carriage suspension assembly featuring maximum compactness in vertical height without sacrificing ability to carry widely differing loads with optimum soft riding characteristics.

Another object of the invention is to provide a composite spring suspension assembly for carriage units utilizing a spring beam, a rigid beam and an air spring interconnected in series with one another and cooperating to support varying loads under optimum springing conditions.

Another object of the invention is the provision of a low-cost, rugged, highly durable spring suspension assembly occupying a minimum of space both lengthwise and vertically of the vehicle utilizing a generally straight spring beam disposed horizontally with one end rigidly secured to the carriage axle and its other end operatively associated with hanger means and featuring the use of an air spring closely offset from the axle end of the spring beam with its upper end underlying the vehicle frame and its lower end supported on a rigid beam underlying and connected to the adjacent end of the spring beam.

Another object of the invention is the provision of a composite spring suspension assembly utilizing a spring beam, a rigid beam, and an air bellows rigidly interconnected in series with one another and cooperating to support a vehicle frame on a carriage axle and utilizing a height control sensing mechanism to regulate the air to the air spring in accordance with the load imposed on the vehicle.

These and other more specific objects will appear upon reading the following specification and claims and upon considering in connection therewith the attached drawing to which they relate.

Referring now to the drawing in which a preferred embodiment of the invention is illustrated:

FIGURE 1 is a fragmentary side elevational view, partly in section, of a vehicle chassis supported by tandem carriages and a preferred embodiment of the invention spring suspension assembly; and FIGURE 2 is a fragmentary transverse sectional view taken along line 2—2 on FIGURE 1.

Referring more particularly to FIGURE 1, there is shown a preferred embodiment of the invention suspension assembly, designated generally 10, showing a pair of tandem-connected carriage axles 11, 12 supporting the rear end of a typical cargo vehicle frame 13. It is to be understood that, as here shown, each axle is arranged to be driven in a conventional manner by differential gearing enclosed within housings 14, 15 and driven from the vehicle engine by drive shafts not shown, but understood as connected to housings 14 and 15 in known manner.

Each of the generally identical composite spring suspension assemblies is formed of essentially identical components including a simple cantilever type spring beam 20, a rigid beam 21 and an air spring or bellows 22. As herein shown, the rear end of the spring beam 20 overlies axle housing 24, whereas the forward end of rigid beam 21 underlies this housing and projects rearwardly therefrom. However, it will be recognized that the composite beam may be reversed end-for-end if desired.

The two beams 20, 21 are rigidly secured to the axle or axle housing by U-bolts 25, appropriately shaped spacer members 26, 27 and a spring seat member 28. From the foregoing it will be clear that the described clamping means serves not only to clamp the adjacent ends of the spring and rigid beams securely to one another but to the axle assembly as well.

As herein shown, the forward end of spring beams 20 extends into a bifurcated hanger rigidly secured to the underside of the vehicle frame and bears upwardly against the underside of a bearing tube 31 secured crosswise of the hanger in accordance with customary practice. The draft connection between the carriage and chassis frame is provided by any suitable means such as a spring draft link 32 having its rear end clamped to the axle housing by clamping bolts 25. The forward end of this link is journalled to the lower end of hanger bracket 30 in any suitable manner and preferable includes a rubber sleeve to absorb shocks, resist abrasion and avoid need for lubrication.

Air springs 22 are any suitable construction and designed to make maximum utilization of the space between the free end of rigid beam 21 and the vehicle frame. As is made clear by FIGURE 1, the upper ends of these springs are secured to the chassis by brackets 35 and the lower ends are secured to the outer ends of the rigid beams as by fastener means 36. As is clearly evident from the drawing, the major portion of the air springs is located below the upper side of the spring beams and in a position closely offset from the square-cut end of this beam. This space is therefore seen to be used to maximum advantage. Equally important is the fact that both the spring and rigid beams are of extremely simple, rugged, inexpensive design. Additionally, the rigid beam is so designed and located with respect to the spring beam and the air spring as to provide a short extension for the spring beam without, however, decreasing the clearance between the road bed and the lowest portion of the housing enclosing the drive connection components for the carriage axles.

The suspension assembly also preferably includes a suitable shock absorber 40 having its lower end pivotally connected by bracket 41 to the free end of rigid beam 21 and its upper end suitably connected to the chassis frame, as by brackets 42. Additionally and if desired, further stability is provided by a tracking bar 43 having one end pivotally connected to the frame by a bracket 44 and the other end pivotally connected to the carriage assembly through a bracket 45.

The invention spring suspension assembly also includes at least one height control valve 46 rigidly connected to the chassis by bracket 47. This control valve is well known to those skilled in this art and includes a supply pipe 48 leading to a source of pressurized air. A second conduit 49 will be understood as extending from the valve to the interior of each of air springs 22 and serves to supply pressurized air to the interior of the bellows as well as means for conveying air back to valve 46 for exhaust to the atmosphere through the usual venting port, not shown, but opening downwardly from the lower end of the valve. Valve 46 includes a pivotally supported operating lever 50 movable vertically to either side of its normal horizontal position. The outer end of this operating lever is connected by a link 51 to one end of the axle assembly and operates to sense any change in height between chassis 13 and the carriage axle.

The operation of the described spring suspension assembly will be evident from the foregoing detailed description of the components and their operating relationship to one another. It is pointed out that pressurized air is constantly available in known manner to maintain the air springs appropriately inflated. Assuming that additional loading is placed on the vehicle, it will be understood that this loading causes the chassis frame to settle closer toward the carriage axles. As this occurs, the height sensing valve 46 will sense the decrease in distance between frame 13 and the axle with the result that link 51 pivots the valve operating lever 50 upwardly opening the air valve to supply pressurized air from conduit 48 through conduit 49 to each of the air springs. This air expands the air springs upwardly, increasing the distance between the frame and the axle with the result that control lever 50 returns to its horizontal or neutral position. In this position it will be understood that the further supply of air is cut off and that no air can escape from the air springs. These springs are now properly charged to cooperate with the spring beams in providing the desired soft ride for that particular load.

If a portion of the load in now removed, the air springs will expand upwardly proportionately, and the increased distance between frame 13 and the axle will result in link 51 pivoting valve lever 50 downwardly to open the air venting valve thereby venting a portion of the air from the air springs. The air springs will now start to collapse until control lever 50 is again in its neutral position and the air spring venting valve is closed. It will be understood that any suitable height control valve may be used such as that disclosed in Harbers et al. Patent No. 3,063,732, granted November 13, 1962.

While the particular carriage with compound spring suspension assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A low-height suspension assembly for vehicle adapted to support a cargo bed closely spaced above the carriage axle while providing a soft ride for wide-range loading and while maintaining maximum road clearance, said suspension assembly including a carriage axle assembly, a vehicle frame closely overlying said axle assembly, means including spring beam means arranged to carry a predetermined share of the vehicle load extending lengthwise of the vehicle, means providing a draft connection between the opposite ends of said axle asembly and said frame, cantilever beam means secured to the lower side of said axle assembly at a level below the adjacent end of said spring beam means, said spring beam means being formed of a plurality of closely-superimposed generally straight spring leaves extending generally longitudinally of and closely beneath said vehicle frame in a plane overlying the top side of said axle, air spring means interposed between the free end of said cantilever beam means and said frame and cooperating with said spring beam means and with said cantilever beam means in resiliently supporting loading placed on said vehicle frame, and means for controlling the supply of pressurized air to and from said air spring means.

2. A suspension assembly as defined in claim 1 characterized in that said cantilever beam means extends laterally from said axle assembly in a direction opposite to the extension therefrom of said spring beam means, and common clamping means for holding the adjacent ends of said spring beam means and of said cantilever beam means securely anchored to the opposite ends of said axle assembly.

3. A suspension assembly as defined in claim 1 characterized in that said air supply control means comprises height-control valve means rigidly supported adjacent said axle assembly and including linkage means cooperating to sense changes in loading on said assembly and responsive thereto to admit air to and release air from said air spring means to support the load at a predetermined distance above the road bed.

4. A low height suspension assembly for a vehicle adapted to support a cargo bed frame above and in close proximity to the carriage axle while providing a soft ride for wide-range loading and while maintaining maximum load clearance at least equal to the clearance between the road and the bottom of the vehicle's differential gear housing of the carriage used to propel the vehicle, said suspension assembly comprising a spring beam and a rigid cantilever beam extending generally parallel to and away from one another and having their adjacent ends rigidly secured respectively to the upper and lower sides of the carriage axle housing, means including draft means coupling the other end of said spring beam to a chassis frame with the upper side of the spring beam spaced closely below said frame, an air spring adapted to underlie the chassis frame and supported on the other end of said cantilever beam opposite one lateral side of the axle housing and opposite the adjacent end of said spring beam, bracket means for securing the upper end of said air spring to the chassis frame, and load sensing means for controlling the quantity of pressurized air in said air spring in response to variations in the loading on said suspension assembly and effective to maintain the shallow spacing between the top side of said spring beam and said chassis frame generally uniform over wide-range variations in the loading on said suspension assembly.

5. A suspension assembly as defined in claim 4 characterized in the provision of stabilizer means for said composite beam unit comprising track bar means extending in a plane crosswise of the vehicle frame and adapted to have one end pivotally connected to the vehicle frame and the other end operatively connected to means fixed to said rigid beam means, said track bar means permitting limited vertical movement of said composite beam unit while preventing sidewise sway of the second end of said composite beam unit relative to the vehicle frame.

6. A low height suspension assembly for a vehicle adapted to support a cargo bed frame above and in close proximity to the carriage axle while providing a soft ride for wide-range loading and while maintaining maximum load clearance at least equal to the clearance between the road and the bottom of the vehicle's differential gear housing of the carriage used to propel the vehicle, said suspension assembly comprising a spring beam and a rigid cantilever beam located in vertically spaced apart generally horizontal planes with their adjacent ends in overlapping relation and secured rigidly to the upper and lower sides respectively of the carriage axle housing and closely adjacent the interior face of each carriage wheel, the free end of said spring beam being positioned to underlie the cargo bed frame and including means for coupling the same to the bed frame so as to transmit draft forces to said carriage, air spring means supported on the upper free end of said rigid cantilever beam closely spaced to the rear side of the axle housing and directly opposite and close to the adjacent end of said spring beam and with the upper end of said air spring directly under and bearing upwardly against the underside of said cargo bed frame, and constant level air valve means connected between said bed frame and the overlapped ends of said beams for controlling the quantity of air in said air spring and effective to maintain the spacing between said axle housing and bed frame generally uniform over wide-range changes in the loading on said suspension assembly.

7. A low height suspension assembly for a vehicle adapted to support a cargo bed frame above and in close proximity to the carriage axle while providing a soft ride for wide-range loading and while maintaining maximum load clearance at least equal to the clearance between the road and the bottom of the vehicle's differential gear housing of the carriage used to propel the vehicle, said suspension assembly comprising a generally horizontally disposed spring beam having a relatively thick rearwardly-facing end anchored to the top of the carriage axle housing closely adjacent the inner face of the adjacent carriage wheel and its forward end extending forwardly of the axle housing closely beneath the cargo bed frame, said spring beam including means for coupling said forward end to said frame and providing a draft connection to said axle housing, a rigid cantilever beam having its forward end overlapping the rear end of said spring beam and rigidly secured to the underside of said axle housing and projecting rearwardly therefrom, air spring means extending vertically closely beside the rear end of said spring beam and the rear side of said axle housing with its lower end anchored to said cantilever beam and its upper end underlying and bearing against said cargo frame, constant level valve means connected between said cargo frame and said axle housing operable to control the air present in said air spring and effective to maintain the spacing between said axle housing and cargo frame substantially uniform over wide-range loading on said suspension assembly.

References Cited by the Examiner

UNITED STATES PATENTS

| | | | |
|---|---|---|---|
| 1,747,902 | 2/1930 | Marcum | 280—104.5 |
| 2,182,248 | 12/1939 | Chayne | 267—20 X |
| 2,222,377 | 11/1940 | Slack | 280—124 X |
| 2,576,935 | 12/1951 | Hayes | 267—18 X |
| 2,632,639 | 3/1953 | Proske | 267—28 |
| 2,717,787 | 9/1955 | Ward | 267—56 X |
| 2,777,686 | 1/1957 | Giacosa | 280—124 X |
| 2,861,797 | 11/1958 | Norrie | 267—56 X |
| 3,063,732 | 11/1962 | Harbers | 267—32 X |
| 3,078,104 | 2/1963 | Chalmers | 280—124 |

FOREIGN PATENTS

| | | |
|---|---|---|
| 96,115 | 9/1922 | Switzerland. |
| 968,391 | 9/1964 | Great Britain. |

BENJAMIN HERSH, *Primary Examiner.*

W. A. MARCONTELL, *Assistant Examiner.*